United States Patent
Cortes Felix et al.

(10) Patent No.: US 9,694,347 B2
(45) Date of Patent: Jul. 4, 2017

(54) HIGH TEMPERATURE COMBUSTION CATALYST

(71) Applicant: JOHNSON MATTHEY PUBLIC LIMITED COMPANY, London (GB)

(72) Inventors: Noelia Montserrat Cortes Felix, Caversham Reading (GB); Andrew Charles Scullard, Caversham Reading (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 269 days.

(21) Appl. No.: 14/385,664

(22) PCT Filed: Mar. 25, 2013

(86) PCT No.: PCT/GB2013/050773
§ 371 (c)(1),
(2) Date: Sep. 16, 2014

(87) PCT Pub. No.: WO2013/150271
PCT Pub. Date: Oct. 10, 2013

(65) Prior Publication Data
US 2015/0064631 A1 Mar. 5, 2015

(30) Foreign Application Priority Data
Apr. 4, 2012 (GB) .................................. 1206066.1

(51) Int. Cl.
*B01J 23/63* (2006.01)
*B01J 37/02* (2006.01)
(Continued)

(52) U.S. Cl.
CPC ............ *B01J 23/63* (2013.01); *B01D 53/864* (2013.01); *B01J 23/42* (2013.01); *B01J 23/44* (2013.01);
(Continued)

(58) Field of Classification Search
CPC ... B01J 23/42; B01J 23/44; B01J 23/63; B01J 23/58; B01J 21/04; B01J 21/063;
(Continued)

(56) References Cited

U.S. PATENT DOCUMENTS 4,492,769 A * 1/1985 Blanchard ............ B01D 53/945
423/213.5
5,001,103 A 3/1991 Koberstein et al.
(Continued)

FOREIGN PATENT DOCUMENTS

CN 10-32749 * 5/1989 ............. B01D 53/94
CN 1032749 A 5/1989
(Continued)

OTHER PUBLICATIONS

"Metal to semiconductor like transition for sintered Ca1-xNaxPd3O4," K. Itoh et al. Solid State Communications 109 (1999), pp. 715-719.*
(Continued)

*Primary Examiner* — Patricia L Hailey
(74) *Attorney, Agent, or Firm* — Young & Thompson

(57) ABSTRACT

A supported precious metal catalyst for the high-temperature combustion of a hydrocarbon includes 1-10% by weight in total of one or more precious metals on a refractory metal oxide support material, and 1-20% by weight in total of one or more stabilizing metals selected from rare earths and Groups IA, IIA, and IIIA of the periodic table of the elements, wherein at least part of the precious metal is present as a mixed metal oxide with one or more of the stabilizing metals.

36 Claims, 3 Drawing Sheets

(51) Int. Cl.
| | |
|---|---|
| B01J 23/42 | (2006.01) |
| B01J 23/44 | (2006.01) |
| B01J 23/58 | (2006.01) |
| B01J 37/03 | (2006.01) |
| B01J 35/10 | (2006.01) |
| B01D 53/86 | (2006.01) |
| F23C 13/08 | (2006.01) |
| B01J 21/04 | (2006.01) |

(52) U.S. Cl.
CPC ........... *B01J 23/58* (2013.01); *B01J 35/1042* (2013.01); *B01J 37/0205* (2013.01); *B01J 37/038* (2013.01); *F23C 13/08* (2013.01); *B01D 2255/1021* (2013.01); *B01D 2255/1023* (2013.01); *B01D 2255/2042* (2013.01); *B01D 2255/2045* (2013.01); *B01D 2255/2047* (2013.01); *B01D 2255/2063* (2013.01); *B01D 2255/2065* (2013.01); *B01D 2255/40* (2013.01); *B01D 2257/702* (2013.01); *B01J 21/04* (2013.01)

(58) Field of Classification Search
CPC ........ B01J 21/066; B01J 21/08; B01J 37/038; B01J 37/08; B01J 37/12; B01J 37/0205; F23C 13/08; B01D 2255/2045; B01D 2255/1021; B01D 2255/1023; B01D 2255/40; B01D 2255/2022; B01D 2255/2025; B01D 2255/2027; B01D 2255/2042; B01D 2255/2047; B01D 2255/2061; B01D 2255/2063; B01D 2255/2065; B01D 2257/702; B01D 2257/7025
USPC .................................. 502/313, 328, 330, 339
See application file for complete search history.

(56) References Cited

U.S. PATENT DOCUMENTS

| | | | | |
|---|---|---|---|---|
| 5,559,073 | A * | 9/1996 | Hu | B01D 53/945 423/213.2 |
| 6,540,968 | B1 * | 4/2003 | Huang | B01D 53/945 423/213.5 |
| 2004/0082470 | A1 | 4/2004 | Gandhi et al. | |
| 2005/0153836 | A1 | 7/2005 | Matsuo et al. | |
| 2006/0034740 | A1 | 2/2006 | Li et al. | |
| 2006/0162317 | A1 * | 7/2006 | Twigg | B01D 53/945 60/278 |
| 2006/0276330 | A1 | 12/2006 | Nakahara et al. | |
| 2008/0045405 | A1 * | 2/2008 | Beutel | B01J 23/44 502/103 |
| 2009/0023580 | A1 | 1/2009 | Tanaka et al. | |
| 2009/0107122 | A1 * | 4/2009 | Ikeda | F01N 13/0097 60/286 |
| 2011/0217216 | A1 * | 9/2011 | Liu | B01D 53/945 423/213.5 |

FOREIGN PATENT DOCUMENTS

| | | | | |
|---|---|---|---|---|
| CN | 10-1321584 | * | 12/2008 | ............. B01J 21/04 |
| CN | 101321584 | A | 12/2008 | |
| EP | 0 845 289 | A1 | 6/1998 | |
| EP | 1 854 538 | A1 | 11/2007 | |
| GB | 2 247 465 | A | 3/1992 | |
| JP | 2004-243305 | * | 9/2004 | ............. B01J 23/89 |
| JP | 2004-243305 | A | 9/2004 | |
| JP | 2004-243306 | * | 9/2004 | ............. B01J 37/02 |
| JP | 2004-243306 | A | 9/2004 | |
| JP | 2006-341201 | * | 12/2006 | ............. B01J 23/63 |
| SU | 1452793 | * | 1/1989 | ............. C01G 55/00 |
| WO | 96/40416 | A1 | 12/1996 | |
| WO | 2007/053283 | A1 | 5/2007 | |

OTHER PUBLICATIONS

"Heart and diamond Fermi arcs in Pd and Pt oxide topological Dirac semimetals," Gang Li et al. Institute of Solid State Physics, Feb. 17, 2016, pp. 1-18.*

International Search Report, dated Jul. 24, 2013, from corresponding PCT application.

* cited by examiner

HIGH TEMPERATURE COMBUSTION CATALYST

This invention relates to a catalyst for the high temperature combustion of a hydrocarbon-containing gas.

High temperature combustion catalysts comprising platinum oxide and/or palladium oxide suffer from poor stability in use. This is believed rise from the reduction PdO present in the catalysts to the less active metal at the high temperatures used and/or sintering of the active PdO/Pd/Pt/PtOx alloy species.

We have found that by the inclusion of certain stabilizing metals, that the stability in use is considerably improved.

Accordingly, the invention provides a supported precious metal catalyst for the high-temperature combustion of a hydrocarbon comprising 1-10% by weight in total of one or more precious metals on a refractory metal oxide support material, further comprising 1-20% by weight in total of one or more stabilising metals selected from rare earths and Groups IA, IIA, and IIIA of the periodic table of the elements, wherein at least part of the precious metal is present as a mixed metal oxide with one or more of said stabilising metals.

The invention further provides a method for preparing the catalyst comprising the steps of separately impregnating a refractory metal oxide with a solution of a stabilising metal and a solution of a precious metal in either order, with first and second calcination steps following each of said impregnations, wherein the first calcination step is performed at a maximum temperature in the range 400-600° C. and the second calcination step performed at a maximum temperature in the range 600-950° C.

The invention further provides a reactor for the high-temperature combustion of a hydrocarbon comprising a plurality of substantially parallel reaction channels, wherein at least one channel is provided with the supported precious metal catalyst.

Without wishing to be bound by theory, it appears that the stabilising metal in the present process interacts with precious metal component of the catalyst and results in mixed precious metal-stabilizer metal oxides on the support. The effect is to surprisingly reduce sintering without a marked lowering of initial activity. This is in contrast to stabilisation of the support.

The supported precious metal catalyst comprises 1-10% by weight in total of one or more precious metals. Preferably the total precious metal content is in the range 5-10% by weight. The precious metal may be present in the catalyst both as a precious metal oxide including the mixed metal oxide, and in elemental form. Accordingly, where two or more precious metals are present, one or more precious metal alloys may also be present. The precious metal preferably comprises platinum and/or palladium, in which at least a portion of the platinum and/or palladium is present as a mixed metal oxide with the stabilising metal. One or more of rhodium, iridium or ruthenium may also be included. More preferably, the precious metal comprises platinum and palladium in which at least a portion of the platinum and/or palladium is present as an oxide, including a mixed metal oxide with the stabilising metal, and which may further comprise one or more Pt/Pd alloys. In such catalysts, the weight ratio of palladium to platinum is 1:10 to 10:1, preferably 1:2 to 10:1, more preferably 1:2 to 2:1, most preferably about 1:1.

The one or more precious metals are supported on a refractory metal oxide support material. The refractory metal oxide support material may be selected from the group consisting of alumina, ceria, zirconia, titania, silica and mixtures thereof. Tin oxide may also be used. The BET surface area of the support is preferably $\geq 60$ $m^2/g$, more preferably $\geq 75$ $m^2/g$. The pore volume of the support is preferably $\geq 0.5$ ml/g. Alumina and alumina-based supports, such as stabilised zirconia-alumina supports, are preferred. Most preferably the support is a high temperature-stable alumina support such as delta alumina and, particularly, theta alumina. Mixed delta-theta aluminas may also be used. Alpha alumina may also be used although its surface area and pore volume are lower and so it is less preferred. Suitable supports are commercially available The supported precious metal catalyst further comprises 1-20% by weight in total of one or more stabilising metals selected from rare earths and Groups IA, IIA, and IIIA of the periodic table of the elements. The stabilising metals may be present in the catalyst as one or more metal oxides, including the mixed metal oxide. By "rare earths", we include the lanthanides, particularly cerium, praseodymium and neodymium and mixtures thereof. In one embodiment, the stabilising metal consists of one or more Group IIA metals. In another embodiment, the stabilising metal consists of one or more Group IIIA metals. In a further embodiment, the stabilising metal consists of one or more rare earth metals. Preferably, the stabilising metal comprises one or more of lithium, sodium, potassium, magnesium, calcium, strontium, barium, scandium, yttrium, lanthanum and cerium.

The supported precious metal catalyst comprises a precious metal oxide comprising a mixed oxide of the precious metal and the stabilising metal. The mixed metal oxide may therefore be described as $M_1M_2O_x$, in which $M_1$ is the stabilising metal and $M_2$ the precious metal with x being an integer to satisfy the oxidation states of the metals. Non-mixed metal precious metal oxides such as PdO or PtO may also be present, however, at least a portion of the precious metal oxide in the catalyst is in the form of one or more mixed metal oxides. Preferably at least 10 mole % of the precious metal oxide, more preferably at least 25 mole % of the precious metal oxide, is in the form of one or more mixed metal oxides. This may be determined by X-Ray Diffraction (XRD).

A particularly preferred stabilising metal comprises calcium, optionally in combination with one or more additional stabilising metals. In such catalysts, the calcium content of the catalyst may be in the range 1-10%, preferably 2.5-7.5% by weight. We have found that such catalysts surprisingly comprise a mixed metal oxide $CaM_3O_4$ in which M is Pd and/or Pt. It is believed that the formation of mixed precious metal oxides may be at least in part responsible for the improvement in stability in use observed.

The catalysts may be prepared by (i) impregnating a refractory metal oxide support with a solution of a precious metal, drying and calcining the impregnated support in a first calcination step to form an un-modified catalyst and (ii) impregnating the unmodified catalyst with a solution of the stabilising metal, drying and calcining the impregnated catalyst in a second calcination step to form the modified catalyst, wherein the first calcination step is performed at a maximum temperature in the range 400-600° C. and the second calcination step performed at a maximum temperature in the range 600-950° C.

Alternatively, the catalysts may be prepared by (i) impregnating the refractory metal oxide with a solution of the stabilising metal, and drying and calcining the impregnated support in a first calcination step at a maximum temperature in the range 400-600° C. to form a modified support material, and (ii) impregnating the modified support material with a solution of the precious metal, and drying and calcining the impregnated modified support in a second calcination step at a maximum temperature in the range 600-950° C. In this way, the amount of stabiliser metal that is "lost" in undesirable metal-support interactions is minimised.

Furthermore, it is preferred that the second calcination step comprises a pre-calcination step at a maximum temperature in the range 400-600° C. before the calcination at 600-950° C. to control the formation of the metal oxides.

Various precious metal compounds and stabilising metal compounds may be used, such as the metal acetates or metal nitrates, which are commercially available. Other soluble salts may be used. The stabilising metal is preferably used in excess of the precious metal to encourage formation of the mixed metal oxide.

Drying and calcination may be performed together or separately. Separate drying is preferred and includes heating the impregnated material to between 50° C. and 150° C. for a period to remove the solvent used in the impregnation step.

The first calcination is performed at a maximum temperature in the range 400-600° C. The first calcination time is preferably short to minimise metal-support interactions and is desirably in the range 0.5 to 5 hours. Similarly, the pre-calcination time is desirably is desirably in the range 0.5 to 5 hours. The second calcination includes a step performed at a temperature in the range 600-950° C.

The second calcination time may be in the range 1-16 hours. Preferably the second calcination is performed at a maximum temperature in the range 750-850° C. to ensure efficient formation of the mixed precious metal-stabilizer metal mixed oxide without the undesirable formation of support-metal mixed oxides. Whereas the calcination steps may be performed under an inert gas such as nitrogen, they are preferably performed under air. In one embodiment, the second calcination at 600-950° C., particularly 750-850° C., is performed in air comprising steam in an amount in the range 1-20% by volume. This steam treatment may further enhance catalyst stability.

The refractory support material may be a powder, in which case the resulting catalyst powder may be shaped using conventional techniques to form a shaped catalyst unit, which may be spherical or cylindrical with flutes or lobes and/or one or more through-holes, designed to reduce pressure drop in use. Alternatively, the catalyst powder may be formed by extrusion, optionally with other components, into conventional honeycomb or monolith units. Preferably, the catalyst powder is formed into a wash-coat and applied as a slurry to metal or ceramic catalyst supports. The metal substrate may be of a steel alloy that forms an adherent surface coating of aluminium oxide when heated, for example a ferritic steel alloy that incorporates aluminium (e.g. Fecralloy®). The catalyst supports may be in the nature of a structured packing or may be a ceramic or metal honeycomb, including a honeycomb with a hexagonal cross-section, a foam or one or more metal foils. If a single metal foil is used, it may have deep-formed corrugations. Alternatively, if a plurality of metal foils are used together to form a stack of foils, some of the foils may have corrugations and others may be substantially flat such that, when stacked alternately, they provide a series of longitudinal sub-channels. Such foils may have thickness typically between 50 μm and 200 μm, for example 100 μm. Alternatively the catalyst support may be in the form of a shaped support unit, such as a pellet with one or more through holes, and the wash-coat applied by spraying it onto the shaped units in a pan coating apparatus. The refractory support material may alternatively be used in the form of a shaped unit, in which case the impregnation, drying and calcination of the precious and stabilising metals leads directly to a shaped catalyst unit.

The invention further provides a process for the high temperature combustion of a hydrocarbon comprising contacting a gaseous mixture of the hydrocarbon and an oxygen-containing gas with the catalyst.

By "combustion of a hydrocarbon" we mean that any hydrocarbons present in the gas are completely oxidised to carbon dioxide and steam. The process is therefore distinct from partial oxidation processes that seek to generate synthesis gas mixtures comprising carbon monoxide and hydrogen.

The hydrocarbon may include one or more aliphatic and aromatic hydrocarbons in the gaseous state, however the present invention is of particular use for hydrocarbon gas streams comprising short chain (C1-C10) aliphatic hydrocarbons, particularly methane. The methane content of the gas mixture fed to the catalyst may be in the range 0.01 to 20% by volume, but preferably is in the range 0.1-5% volume.

Additional components such as gaseous sulphur compounds, carbon monoxide, carbon dioxide, hydrogen, nitrogen oxides, steam and inert gases may also be present in the gas mixture fed to the catalyst.

The oxygen-containing gas may be oxygen, oxygen-enriched air or air. Typically air is preferred in combustion processes, but where the inclusion of nitrogen is undesirable, oxygen or oxygen-enriched air may be used.

The combustion is performed under oxidising conditions and so the oxygen is typically present in excess of the hydrocarbon being combusted. Preferably the gas mixture composition is controlled to prevent soot formation.

The mixture of hydrocarbon and oxygen may be pre-heated using conventional heating equipment to a pre-heat temperature in the range 650-950° C. The combustion process may be operated at a pressure in the range 1-40 bar abs, preferably 1-10 bar abs.

The gas mixture may be passed over the catalyst disposed in or on conventional combustion apparatus.

Alternatively, the gas mixture may be passed over a catalyst disposed in a mini- or micro-channel reactor. Such a reactor comprises a plurality of channels through which the gas mixture flows, each channel typically having a height up to 10 mm and a width up to 25 mm. In a mini-channel reactor, the catalyst may be disposed on removable inserts formed from one or more corrugated foils as described above. Alternatively, the channels may be packed with pelletised catalyst. In a micro-channel reactor, which may have channel heights and widths of 5 mm or less, preferably 1 mm or less, the catalyst may be disposed on the channel walls. Mini- and micro-channel reactors may be configured with two adjacent sets of channels that are in good thermal contact. This configuration enables efficient heat transfer between adjacent channels.

The gas mixture may be passed over the catalyst at an inlet temperature in the range 650-950° C., preferably 700-900° C. Below about 650° C. the light off and activity of the catalyst are insufficient for the proposed duties, whereas above 950° C. the combustion is complete.

The process may be applied to catalytic combustion to generate heat for endothermic reactions such as syngas or hydrogen generation, including steam methane reforming; catalytic combustion in gas turbines, domestic water heaters, fuel processors for fuel cells and industrial process heaters; and catalytic combustion of exhaust gas, including exhaust gas odour control and exhaust gas emission control in catalytic converters, and diesel oxidation.

The invention is further described by reference to the following Examples and FIGS. 1-5.

Example 1

Preparation of Modified Catalyst Supports

Figure 1:
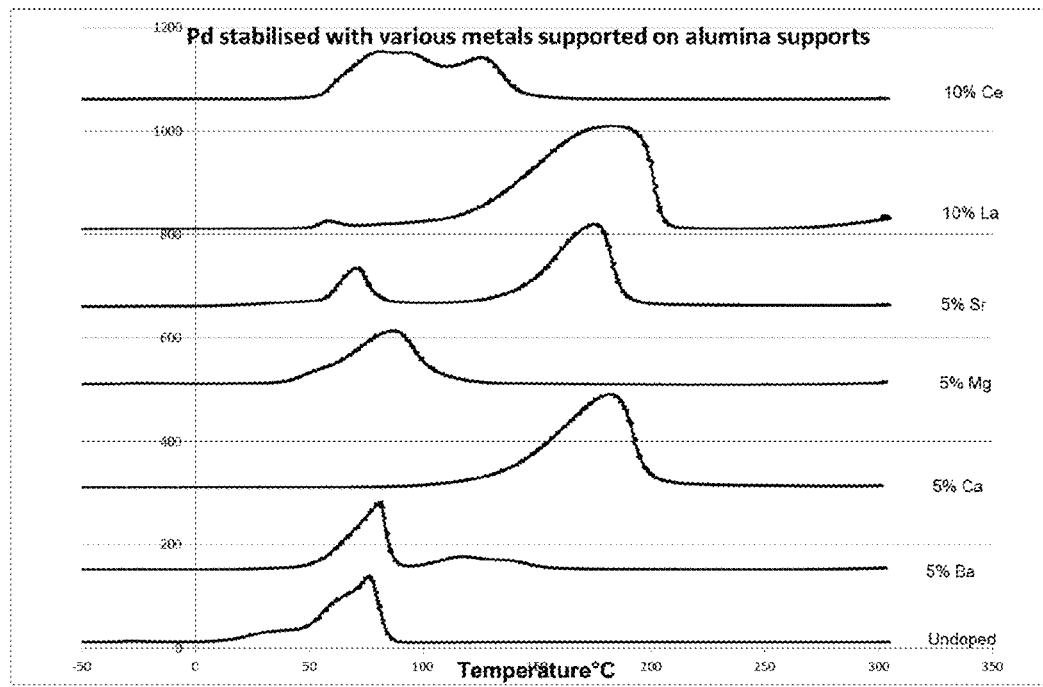
FIG. 1 depicts a TPR of a range of metal-stabilised catalysts containing PdO.

Unless otherwise stated, the support material used was a commercially available theta phase transition alumina powder, stable up to temperatures of 1000° C. and having a surface Area approximately 100 m$^2$/g and a pore volume of approximately 1.1 ml/g. In the following, the percentage weights of stabilising metal reported are percentage weights as metal on the refractory support material.
(a) 5% wt Ca/Al2O3

5.89 g calcium nitrate tetrahydrate was dissolved in a small mount of water and made up to 50 ml with gentle heating. The metal solution was then added to 20 g of the alumina support in three portions with constant stirring. A small amount of water was used for rinsing of the glassware and to achieve incipient wetness. The impregnated support was then dried at 105° C. before being calcined at 500° C. for 2 hours.
(b) 1% wt Ca/Al2O3, 2.93% wt Ca/Al2O3, 10% t Ca/Al2O3

This method was repeated at loadings of Ca up to 10% of the support weight.
(c) Barium Doped: 5% wt Ba/Al2O3, 10% wt Ba/Al2O3, 20% wt Ba/Al2O3
(d) Magnesium Doped: 1.77% wt Mg/Al2O3, 5% wt Mg/Al2O3
(e) Strontium Doped: 5% wt Sr/Al2O3
(f) Cerium Doped: 10% wt Ce/Al2O3
(g) Lanthanum Doped: 10% wt La/Al2O3

The method of example 1 (a) was repeated using other stabilising metals at loadings in the range of 1-20% of the support weight. The metal salts used to impregnate the alumina were as follows; Barium Acetate 99%, Barium Nitrate 99%, Magnesium Nitrate Hexahydrate 98%, Strontium Nitrate, 99%. Cerium Nitrate Hexahydrate 99.6%, Lanthanum Nitrate. The salt solutions were heated if necessary to achieve dissolution of the salts. All of the impregnated supports were dried at 105° C. before being calcined at 500° C. for 2 hours.

Example 2

Preparation of Catalysts Using Modified Supports

A selection of the modified catalyst supports of Example 1 were impregnated with solutions of platinum nitrate and palladium nitrate, dried and calcined to form the final catalyst. The Pd Nitrate solution contained 15.10% wt Pd; the Pt nitrate solution contained 16.17% wt Pt.

(a)(i) 5.25% Pd/1.75% Pt/5% wt Ca/Al2O3

1.74 g of Pd Nitrate was mixed with 0.54 g of Pt Nitrate. Approximately 2.5 ml of water was subsequently added to form a treatment solution. This solution was then added drop-wise whilst stirring to 5 g of the 5% wt Ca/Al2O3 support whilst stirring. The pore volume of support was approximately 1 ml/g. A small amount of water was additionally used for rinsing of glassware and to achieve incipient wetness. The impregnated material was then dried at 105° C. before being calcined at 500° C. for 2 hours.

This method was then repeated using a range of the modified supports and different Pd and Pt loadings. Combined palladium and platinum catalysts were prepared at 7% wt in total 9 as metal on the modified support) using three different Pd:Pt ratios, Pd:Pt (wt), 3:1, 1.8:1, and 1:1.
(b) Catalyst comprising only Pd or Pt as the precious metal component were also prepared.
(c) Comparative catalysts on the un-modified support were also prepared.

The various catalysts prepared are listed below. In the following, the percentage weights of precious metal are as metal on the modified support, whereas the percentage weights of the stabilising metal are as metal on the refractory support material.
(a) Catalysts comprising Pt and Pd and a stabilising metal.

| Example Reference | Formulation (% wt) |
|---|---|
| 2(a) (i) | 5.25Pd 1.75Pt/5Ca/Al2O3 |
| 2(a) (ii) | 5.25Pd 1.75Pt/1Ca/Al2O3 |
| 2(a) (iii) | 5.25Pd 1.75Pt/2.93Ca/Al2O3 |
| 2(a) (iv) | 5.25Pd 1.75Pt/10Ca/Al2O3 |
| 2(a) (v) | 3.5Pd 3.5Pt/5Ca/Al2O3 |
| 2(a) (vi) | 4.5Pd 2.5Pt/5Ca/Al2O3 |
| 2(a) (vii) | 5.25Pd 1.75Pt/5Ba/Al2O3 |
| 2(a) (viii) | 3.5Pd 3.5Pt/10Ba/Al2O3 |
| 2(a) (ix) Ba acetate | 5.25Pd 1.75Pt/10Ba/Al2O3 |
| 2(a) (x) Ba nitrate | 5.25Pd 1.75Pt/10Ba/Al2O3 |
| 2(a) (xi) | 5.25Pd 1.75Pt/20Ba/Al2O3 |
| 2(a) (xii) | 5.25Pd 1.75Pt/5Mg/Al2O3 |
| 2(a) (xiii) | 5.25Pd 1.75Pt/1.77% Mg/Al2O3 |
| 2(a) (xiv) | 5.25Pd 1.75Pt/5Sr/Al2O3 |
| 2(a) (xv) | 5.25Pd 1.75Pt/10Ce/Al2O3 |
| 2(a) (xvi) | 5.25Pd 1.75Pt/10La/Al2O3 |

(b) Catalysts comprising Pd or Pt and a stabilising metal

| Example | Formulation (% wt) |
|---|---|
| 2(b) (i) (Ba acetate) | 5.25Pd/5Ba/Al2O3 |
| 2(b) (ii) (Ba nitrate) | 5.25Pd/5Ba/Al2O3 |
| 2(b) (iii) | 5.25Pd/5Mg/Al2O3 |
| 2(b) (iv) | 5.25Pd/5Ca/Al2O3 |
| 2(b) (v) | 5.25Pd/5Sr/Al2O3 |
| 2(b) (vi) | 5.25Pd/1Ca/Al2O3 |
| 2(b) (vii) | 5.25Pd/2.93Ca/Al2O3 |
| 2(b) (viii) | 5.25Pd/10Ce/Al2O3 |
| 2(b) (ix) | 1.75Pt/10Ba/Al2O3 |
| 2(b) (x) | 5.25Pd/10La/Al2O3 |

(c) Comparative catalysts without stabilising metal

| Example Reference | Formulation (% wt) |
|---|---|
| Comparative 1 | 5.25Pd/Al2O3 |
| Comparative 2 | 1.75Pt/Al2O3 |

Catalysts were compared for their reducibility of the PdO using Temperature-programmed reduction (TPR). The TPR was performed over the temperature range −50° C. to 300° C. at a 20 degrees Celsius/minute ramp rate under a 10% vol. hydrogen in nitrogen gas stream.

FIG. 1 depicts the variability in the PdO reduction over the different stabilised catalysts 2 (b) (ii)-(v), (viii) & (x) and Comparative catalyst 1 having a Pd content of 5.25% wt. Comparative 1 shows a single peak with a peak maxima around 75° C. The addition of stabilising metal oxides to the support seems to either shift or produce a clear second peak of PdO reduction. The catalyst comprising the 5% wt Mg-alumina support shows a slight shift of the main peak to a higher temperature, whilst strontium shows two clear peaks, one overlaying the standard PdO peak at 75° C. with the other at approximately 175° C. The 2(b) (iv) TPR in which the catalyst is stabilised by 5% wt Ca shows no peak at 75° C. with only a large single peak at 175° C.

Figure 2:
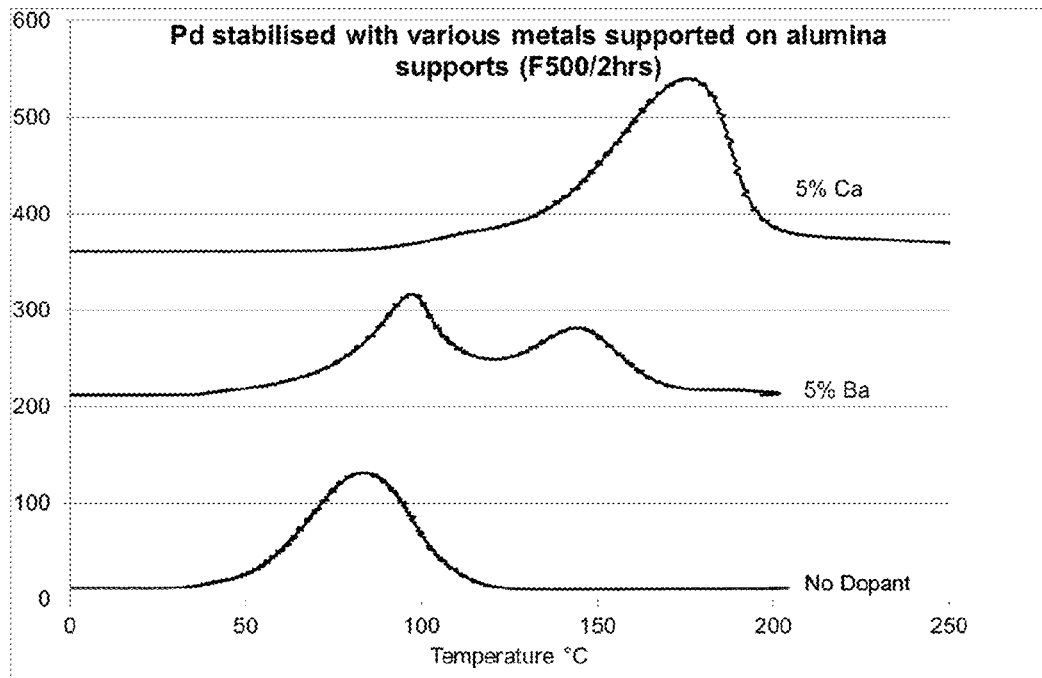
FIG. 2 depicts a TPR of metal stabilised catalysts containing PdO and PtO.

FIG. 2 depicts the TPR's obtained for the CaO— and BaO-stabilised Pt/Pd catalysts and an un-modified Pt/Pt catalyst. The results again show the effect of the stabilising metals on the precious metal reduction.

X-ray diffraction (XRD) analysis of the catalysts indicates the presence of mixed stabiliser-Pd (or Pt) oxides. XRD analysis of two materials calcined at 500° C. and 800° C. have been completed:

2(a) (iv) 5.25Pd 1.75Pt/10Ca/Al2O3
2(a) (v) 3.5Pd 3.5Pt/5Ca/Al2O3

The catalysts comprised theta alumina with some delta alumina. Ca is present after calcination at 800° C. as $CaPd_3O_4$. Pt is also present in this phase with the two noble metals being somewhat interchangeable. No evidence of CaO or Ca-aluminate species were seen in the samples calcined at 800° C. Calcination at 500° C. alone did not produce the mixed metal oxide.

Example 3

Preparation of Catalyst

A 3.5% Pd 3.5% Pt/Al$_2$O$_3$ catalyst was first prepared by impregnating 450 g of alumina with 101.04 g of Pd Nitrate (Pd content 15.10%) and 95.11 g of Pt nitrate (Pt content 16.56%) and about 250 ml of water. The material was then dried overnight and calcined at 500° C./4 hrs.

2.95 g of Calcium nitrate tetrahydrate was dissolved in about 10 ml of water. This solution was then added dropwise whilst stirring to 10 g of the calcined 3.5% Pd 3.5% Pt/Al$_2$O$_3$ material. The pore volume of the material was about 1 ml/g. A small amount of water was additionally used for rinsing of glassware and to achieve incipient wetness. The Ca-impregnated material was then dried at 105° C. before being calcined again at 500° C. for 2 hours to produce a catalyst reference 3(a)(i).

Example 4

Catalyst Testing

Catalysts of Examples 2 and 3 were tested using laboratory combustion apparatus comprising a quartz tube reactor which contains the pelletized catalyst enclosed in a furnace. The apparatus was fed by a mixture of three gases (N2, Air, CH4) controlled via mass flow controllers. Upstream of the furnace, the mixed feed gas was passed through a heated section where liquid water was added to it to produce a feed gas for the reactor comprising N2, Air, CH4 and steam. The product gases were recovered from the reactor and passed through a water separator to produce a dry product gas which was analysed using Gas Chromatography.

Prior to testing each catalyst was calcined at 800° C. for 12 hrs in a 10% vol steam in air atmosphere. This was found to generate the mixed metal oxides.

The catalysts were then tested using the laboratory combustion apparatus at an inlet temperature of 850° C. with 1% vol methane, 6.3% vol Oxygen, 15% vol H2O, N2 balance. The pressure was typically in the range 250-750 mbar. The MHSV was about 12,000 L gas/g cat/hr. The exit temperatures were typically around 850-950° C. depending on the activity of the catalyst and the resulting exotherm.

The percentage methane combustion was recorded throughout the period of the test, which usually lasted between 40-100 hours to allow sufficient stability data to be obtained.

Activity was determined by calculating the percentage hydrocarbon (HC) combusted by measuring the inlet and outlet concentrations of the hydrocarbons. Percentage Activity was therefore calculated as; $100-[(HC_{in}/HC_{out})*100]$.

The following table lists the results for the catalysts tested with their activity at various points in time calculated. As stability is of greater importance than overall activity, the % declines in performance over the time period are also reported. The precious metal content is reported as weight % of metal on the modified support. The stabilising metal content is reported as weight % on the refractory metal oxide support.

| Catalyst Example | Pd/Pt | Stabilising metal | Activity (% conversion) | | | | % Activity drop | | |
|---|---|---|---|---|---|---|---|---|---|
| | | | 2 hrs | 20 hrs | 40 hrs | 65 hrs | 20 hrs | 40 hrs | 65 hrs |
| 2(a)(i) | 5.25/1.75 | 5Ca | 26 | 25 | 24 | 23 | 4 | 8 | 12 |
| 2(a)(ii) | 5.25/1.75 | 1Ca | 35 | 27 | 23 | — | 23 | 34 | — |
| 2(a)(iii) | 5.25/1.75 | 2.93Ca | 34 | 29 | 26 | 25 | 15 | 24 | 26 |
| 2(a)(iv) | 5.25/1.75 | 10Ca | 15 | 12 | 13 | — | 20 | 13 | — |
| 2(a)(v) | 3.5/3.5 | 5Ca | 20 | 20 | 20 | 20 | 0 | 0 | 0 |
| 2(a)(vi) | 4.5/2.5 | 5Ca | 29 | 29 | 27 | 26 | — | 7 | 10 |
| 2(a)(vii) | 5.25/1.75 | 5Ba | 26 | 22 | 21 | — | 15 | 19 | — |
| 2(a)(viii) | 3.5/3.5 | 10Ba | 23 | 20 | 19 | 18 | 13 | 17 | 22 |
| 2(a)(ix) | 5.25/1.75 | 10Ba acetate | 31 | 26 | 23 | — | 16 | 26 | — |
| 2(a)(x) | 5.25/1.75 | 10Ba nitrate | 36 | 29 | 25 | 24 | 19 | 31 | 33 |
| 2(a)(xi) | 5.25/1.75 | 20Ba | 34 | 27 | 24 | — | 21 | 29 | — |
| 2(a)(xii) | 5.25/1.75 | 5Mg | 22 | 19 | 17 | — | 14 | 23 | — |
| 2(a)(xiii) | 5.25/1.75 | 1.77Mg | 23 | 19 | 18 | 17 | 17 | 22 | 26 |
| 2(a)(xiv) | 5.25/1.75 | 5Sr | 35 | 30 | 27 | — | 14 | 23 | — |
| 2(a)(xv) | 5.25/1.75 | 10Ce | 30 | 22 | 19 | — | 27 | 37 | — |
| 2(a)(xvi) | 5.25/1.75 | 10La | 27 | 24 | 21 | 19 | 11 | 22 | 30 |

-continued

| Example | Catalyst Pd/Pt | Stabilising metal | Activity (% conversion) | | | | % Activity drop | | |
|---|---|---|---|---|---|---|---|---|---|
| | | | 2 hrs | 20 hrs | 40 hrs | 65 hrs | 20 hrs | 40 hrs | 65 hrs |
| 3(a)(i) | 3.5/3.5 | 5Ca | 20 | 20 | — | — | — | — | — |
| Comp | 5.25/1.75 | — | 34 | 22 | 19 | — | 35 | 44 | — |
| Comp | 3.5/3.5 | — | 24 | 21 | 18 | 18 | 13 | 25 | 25 |

Figure 3:
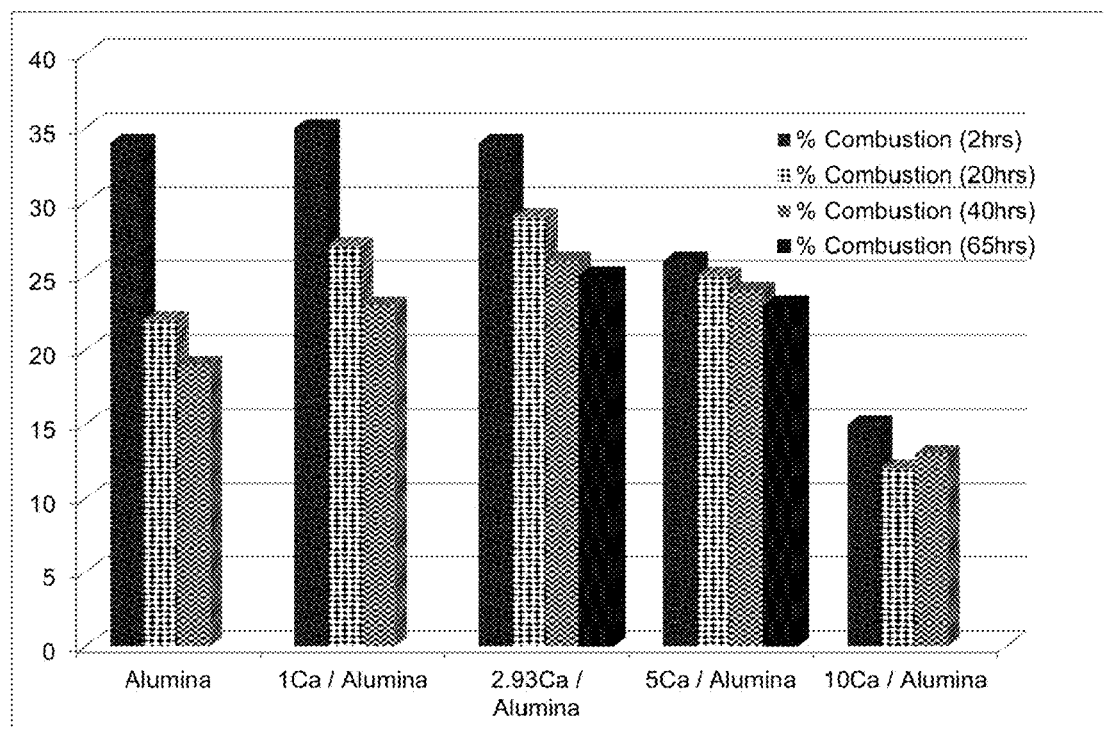
FIG. 3 depicts the activity and stability of calcium-stabilised and un-stabilised catalysts in methane combustion.

Whereas all the stabilising metals appear to have an effect, calcium at 1-10% wt stands out as offering the most stable catalysts under these conditions. FIG. 3 shows how the addition of Ca to a catalyst formulation improves stability with minimal effects on activity. Similar effects are observed with other dopants and at various Pd:Pt ratios.

Figure 4:
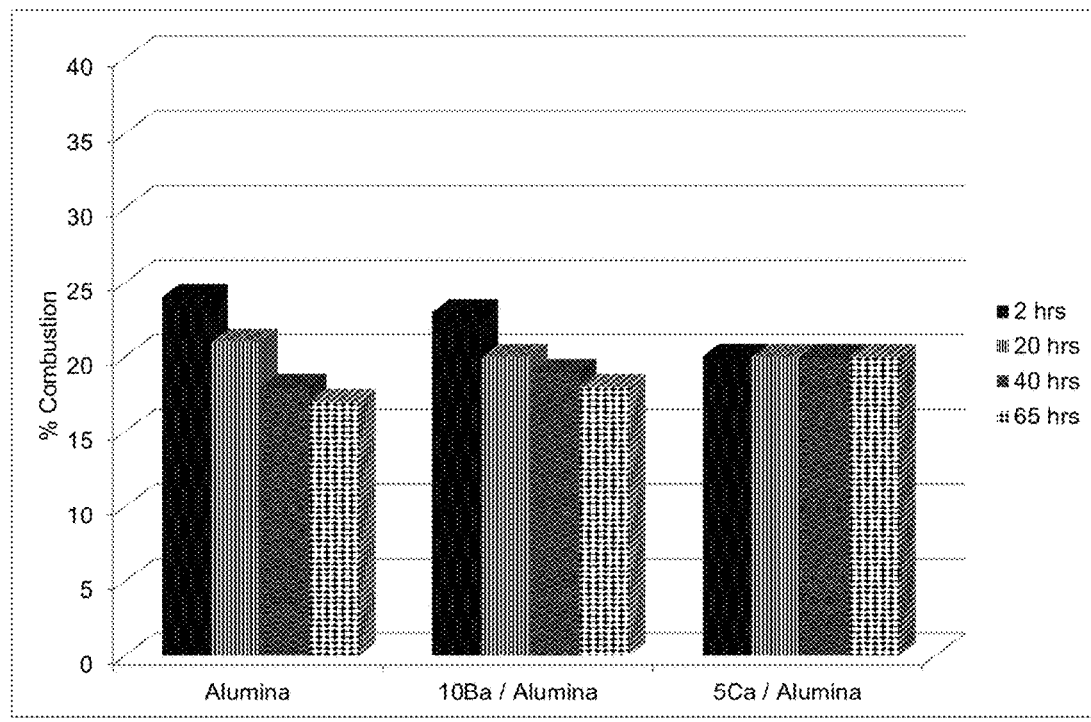
FIG. 4 depicts the activity and stability of calcium- and barium-stabilised catalysts in methane combustion.

FIG. 4 shows effect at a different PGM ratio (Pd:Pt 1:1 by weight). This ratio is seen to be more stable than the Pd rich formulation when compared on an un-modified support.

Figure 5:
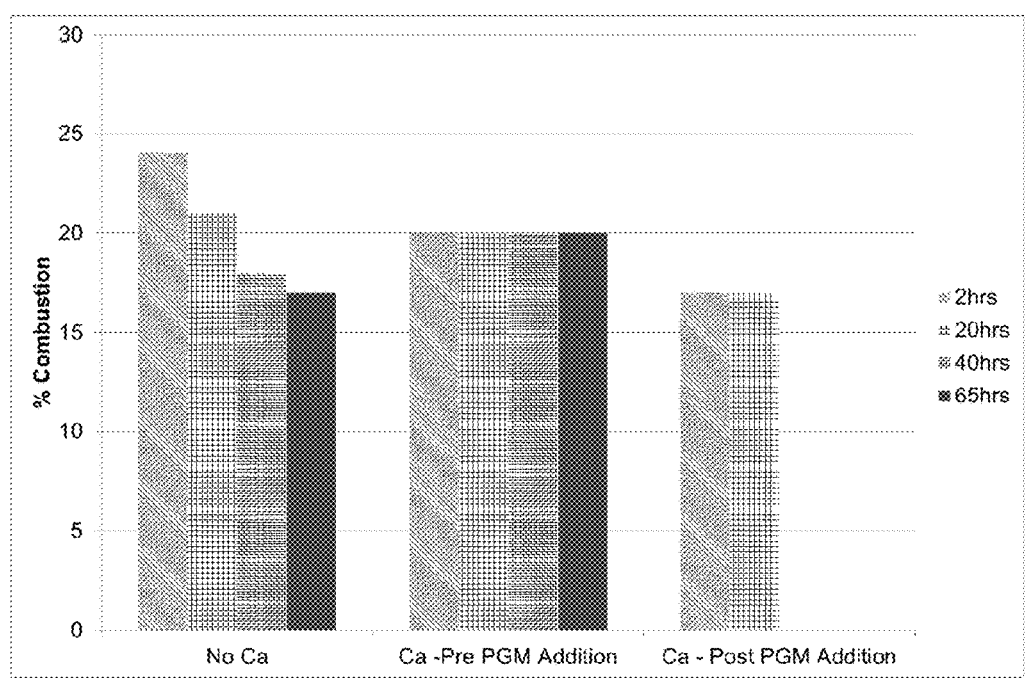
FIG. 5 depicts the activity and stability calcium-stabilised catalysts in methane combustion.

FIG. 5 depicts the catalyst activity and stability comparing pre-Pt and post-Pt modification with Ca. The results suggest a small reduction in activity but equivalent stability from post treatment with Ca.

Example 5

Catalyst Testing

Methane combustion was performed using a multi-channel reactor including a Ca-modified Pt/Pd combustion catalyst prepared as described above and wash-coated onto metal foils placed within channels in the reactor.

The test was run over 1050 hours at three different average temperatures. Up to approximately 600 hours the average temperature was about 800° C., between 600-850 hours the average was about 825° C., and between 850-1050 hours, the average temperature was about 850° C.

Methane conversion was monitored with time to establish the catalyst stability. There was an initial decline in conversion, and then after about 200 hours it reached steady state. Thereafter as the temperature was increased the catalyst activity also increased but in each case the catalyst activity did not significantly decline and conversion remaining at about 55% at about 850° C.

The invention claimed is:

1. A supported precious metal catalyst for the high-temperature combustion of a hydrocarbon comprising 1-10% by weight in total of precious metals on a refractory metal oxide support material, further comprising 1-20% by weight in total of one or more stabilizing metals selected from rare earths and Groups IA, IIA, and IIIA of the periodic table of the elements, wherein the precious metals comprises platinum and palladium, at least part of the platinum and/or palladium is present as a mixed metal oxide with one or more of said stabilizing metals, and the weight ratio of palladium to platinum is 1:10 to 10:1.

2. A catalyst according to claim 1 wherein the total precious metal content is in the range 5-10% by weight.

3. A catalyst according to claim 1 wherein the weight ratio of palladium to platinum is 1:2 to 10:1.

4. A catalyst according to claim 1 wherein the refractory metal oxide support material is selected from the group consisting of alumina, zirconia, titania, silica, tin oxide and mixtures thereof.

5. A catalyst according to claim 1 wherein the stabilizing metal comprises one or more of lithium, sodium, potassium, magnesium, calcium, strontium, barium, scandium, yttrium, lanthanum and cerium.

6. A catalyst according to claim 1 wherein the stabilizing metal comprises calcium.

7. A catalyst according to claim 6 wherein the calcium content of the catalyst is in the range 1-10%, by weight on the refractory metal oxide support.

8. A catalyst according to claim 6 wherein the mixed metal oxide comprises $CaM_3O_4$ in which M is Pd and/or Pt.

9. A catalyst according to claim 6 wherein the calcium content of the catalyst is in the range 2.5-7.5% by weight on the refractory metal oxide support.

10. A catalyst according to claim 1 wherein the refractory metal oxide support material is a powder.

11. A method for preparing a catalyst according to claim 1 wherein the precious metal comprises platinum and palladium and the weight ratio of palladium to platinum is 1:10 to 10:1, comprising the steps of separately impregnating a refractory metal oxide with a solution of a stabilizing metal and a solution of the precious metals in either order, with first and second calcination steps following each of said impregnations, wherein the first calcination step is performed at a maximum temperature in the range 400-600° C. and the second calcination step performed at a maximum temperature in the range 600-950° C.

12. A method according to claim 11 comprising the steps of (i) impregnating a refractory metal oxide support with a solution of the precious metals, drying and calcining the impregnated support in a first calcination step to form an un-modified catalyst and (ii) impregnating the unmodified catalyst with a solution of the stabilizing metal, drying and calcining the impregnated catalyst in a second calcination step to form the modified catalyst, wherein the first calcination step is performed at a maximum temperature in the range 400-600° C. and the second calcination step performed at a maximum temperature in the range 600-950° C.

13. A method according to claim 11 comprising the steps of (i) impregnating the refractory metal oxide with a solution of the stabilizing metal, and drying and calcining the impregnated support in a first calcination step at a maximum temperature in the range 400-600° C. to form a modified support material, and (ii) impregnating the modified support material with a solution of the precious metals, and drying and calcining the impregnated modified support in a second calcination step at a maximum temperature in the range 600-950° C.

14. A method according to claim 11 wherein the second calcination step is performed at a maximum temperature in the range 750-850° C.

15. A method according to claim 11 wherein the second calcination step comprises a pre-calcination step at a maximum temperature in the range 400-600° C.

16. A method according to claim 11 wherein the calcination is performed in air comprising steam in an amount in the range 1-20% by volume.

17. A method according to claim 11 wherein the refractory metal oxide support material is a powder and the resulting catalyst powder is applied as a wash-coat onto a metal or ceramic catalyst support.

18. A catalyst according to claim 1 wherein the mixed metal oxide further comprises one or more Pt/Pd alloys.

19. A catalyst according to claim 1 wherein the weight ratio of palladium to platinum is 1:2 to 2:1.

20. A catalyst according to claim 1 wherein the weight ratio of palladium to platinum is about 1:1.

21. A reactor for the high-temperature combustion of a hydrocarbon comprising a plurality of substantially parallel reaction channels, wherein at least one channel is provided with a supported precious metal catalyst for the high-temperature combustion of a hydrocarbon comprising 1-10% by weight in total of precious metals on a refractory metal oxide support material, further comprising 1-20% by weight in total of one or more stabilizing metals selected from rare earths and Groups IA, IIA, and IIIA of the periodic table of the elements, wherein the precious metal comprises platinum and palladium and at least part of the platinum and/or palladium is present as a mixed metal oxide with one or more of said stabilizing metals, and the weight ratio of palladium to platinum is 1:10 to 10:1.

22. A reactor according to claim 21, wherein the catalyst is supported on a removable structure.

23. A reactor according to claim 21, wherein the removable structure is a foil.

24. A reactor according to claim 21, wherein each channel is defined by one or more walls and wherein the catalyst is provided on the walls.

25. A reactor according to claim 21, wherein the catalyst is in the form of a powder, pellet or particle.

26. A reactor according to claim 21, wherein at least one channel that is not provided with the precious metal catalyst, is provided with a catalyst for an endothermic reaction.

27. A reactor according to claim 26, wherein the endothermic reaction is steam methane reforming.

28. A reactor according to claim 27, wherein the catalyst for steam methane reforming is provided in alternate channels and the precious metal catalyst is provided in the remaining channels.

29. A reactor according to claim 21, wherein each channel has at least one dimension less than 10 mm.

30. A process for the high temperature combustion of a hydrocarbon, comprising contacting a gaseous mixture of a hydrocarbon and an oxygen-containing gas with a catalyst according to claim 1 wherein the precious metal comprises platinum and palladium and the weight ratio of palladium to platinum is 1:10 to 10:1.

31. A process according to claim 30 wherein the hydrocarbon includes one or more aliphatic and aromatic hydrocarbons in the gaseous state.

32. A process according to claim 30 wherein the hydrocarbon includes methane and the methane content of the gas mixture fed to the catalyst is in the range 0.01 to 20% by volume.

33. A process according to claim 30 wherein the oxygen-containing gas is oxygen, oxygen-enriched air or air.

34. A process according to claim 30 wherein the mixture of hydrocarbon and oxygen is preheated to a pre-heat temperature in the range 650-950° C.

35. A process according to claim 30 operated at a pressure in the range 1-40 bar abs.

36. A process according to claim 30 operated in a reactor comprising a plurality of substantially parallel reaction channels, wherein at least one channel is provided with a supported precious metal catalyst for the high-temperature combustion of a hydrocarbon comprising 1-10% by weight in total of precious metals on a refractory metal oxide support material, further comprising 1-20% by weight in total of one or more stabilizing metals selected from rare earths and Groups IA, IIA, and IIIA of the periodic table of the elements, wherein the precious metal comprises platinum and palladium and at least part of the platinum and/or palladium is present as a mixed metal oxide with one or more of said stabilizing metals, and the weight ratio of palladium to platinum is 1:10 to 10:1.

* * * * *